Patented June 20, 1939

2,163,164

UNITED STATES PATENT OFFICE 2,163,164

FOOD PRODUCT

Leonard Wickenden, Manhasset, and William Baptiste, Brooklyn, N. Y., assignors to Beau May Process Corporation, New York, N. Y., a corporation of New York No Drawing. Application April 28, 1937, Serial No. 139,482

4 Claims. (Cl. 99—130)

This invention relates to improved fruit-flavored food products and to methods of preparing the same.

The invention aims to place in the hands of the housewife a packaged product which she can conveniently use as the foundation for salads, desserts, or other dishes, all of which will contain the flavoring constituents of pure fresh fruits in their original forms.

In carrying out the invention use is made of a suitable vehicle, and the best vehicle commercially available at the present time is gelatin.

Prior to the present invention no one has successfully produced a readily soluble gelatin product flavored exclusively with pure fruit juices. Gelatin desserts have appeared on the market in two general forms, the one commonly known in the United States being a powder of a more or less granular nature containing dry gelatin. Since it has up to the present been impossible to reduce fresh fruit or fresh fruit juice to dry form without considerable loss of flavor it has been necessary to flavor gelatin powders with synthetic flavor or with an extract, such as an alcoholic extract, of fruit.

The other general form of gelatin product, which is more common in Europe, consists of a rubbery cake made by dissolving sugar, gelatin, and citric acid in water and then adding flavor and color. These cakes sometimes contain small amounts of fresh fruit juices, but are mainly flavored with synthetics, and are more difficult to dissolve than the powdered gelatin. They are marketed in the form of individual cubes which tend to adhere together and are troublesome to separate.

The best form of natural fruit flavoring known to us is covered by United States applications Serial Nos. 748,819 and 41,846, filed by Wadsworth and Wickenden, and consists of a heavy syrup of approximately 75° Brix containing substantially unchanged and unaltered all of the flavoring constituents of several times or more of its volume of fresh fruit. This syrup may or may not contain fruit pulp, and in either form is referred to herein as "intensified fruit".

In one form of our invention a vehicle is prepared by mixing together granulated sugar, citric acid, gelatin and salt. After these dry ingredients have been thoroughly mixed we stir in a portion of "intensified fruit" until a kind of granular dough containing about 10% of water is formed. This dough is then heated to such a temperature that it will soften and reach a consistency which will permit it to just flow. This temperature will average about 130° F. When the dough has reached this condition it is impregnated with minute bubbles of air or inert gas.

The mass may be aerated by various means, either mechanically or chemically. Thus air may be forced into it under pressure through a piece of gauze or fine cloth; similarly carbon dioxide may be injected into the mass. The simplest way however is to add about 0.05% to 0.25% of an effervescent salt mixture such as a neutral mixture of a carbonate or bicarbonate and a solid harmless acid or acid salt. Thus solid mixtures of citric, tartaric, malic, lactic and similar acids or their acid salts with sodium, ammonium or potassum carbonate or bicarbonate, in the proper proportions, may be used. This salt mixture should, of course, be added to the dough-like mass when the latter is in the heat-softened condition. It immediately reacts in the presence of water in the mass to liberate carbon dioxide which then aerates the mass.

It is very desirable that the dough-like mixture be not heated above that temperature at which it begins to soften because at higher temperatures the gelatin softens and dissolves to too great a degree and tends to form a cake which is sticky and difficult to dissolve in water. The preferred temperature is about 130° F. Obviously if there is insufficient water in the intensified fruit juice more water can be added to the mass before it is heated. The preferred amount of water is from 7 to 9 per cent by weight.

An example of a preferred formula used in the above process is given below, the parts being given by weight:

Example 1

| | Parts |
|---|---|
| Granulated sugar | 70.5 |
| Intensified fruit | 18.0 |
| Citric acid | 0.9 |
| Gelatin | 6.5 |
| Salt | 0.1 |
| Added water | 4.0 |

When the dough resulting from the mixture of the above ingredients has been heated and impregnated with bubbles as explained above it becomes quite fluid and can readily be poured into packages for retail distribution. As the mixture cools in the package it sets into a cake which retains trapped within its mass innumerable minute bubbles. This cake is practically dry to the touch but contains enough moisture to retain the "intensified fruit" in the form of a heavy syrup and hence to hold the fruit juice in a liquid state similar, except for the smaller amount of water, to its original condition in the fruit.

When the package is later delivered to the housewife, the peculiar spongy texture of the cake causes it to dissolve very quickly in a relatively small quantity of hot water. The "gel" resulting from this solution is flavored solely with the fruit juice contained in the "intensified fruit". It has the natural taste and aroma of the corresponding fresh fruit, and is suitable for salads, desserts, or other dishes.

In another form of the invention an additional ingredient in the form of an edible protein colloid, such as dry egg albumen, or in the form of a carbohydrate colloid, such as tapioca starch, may be added. With such an addition the resulting cake after being dissolved and permitted to partly gel can be whipped into a fruit sponge, or whipped with the addition of cream to form a type of Bavarian cream.

A typical formula for such a food product is as follows:

Example 2

| | Parts |
|---|---|
| Granulated sugar | 65 |
| Dry gelatin | 5 |
| Dry egg albumen | 3 |
| Citric acid | 0.15 |
| Salt | 0.1 |
| Neutral carbonate mixture | 0.1 |
| Intensified fruit | 20 |
| Water | 7 |

In some cases it may be preferred to add concentrated milk in the form of condensed milk or milk powder to the formula, thus avoiding the necessity of adding milk during the preparation of Bavarian cream. An example of such a formula is as follows:

Example 3

| | Parts |
|---|---|
| Sucrose | 49.0 |
| Gelatin | 4.0 |
| Albumen | 1.5 |
| Water | 6.7 |
| Intensified fruit | 17.0 |
| Citric acid | .7 |
| Dried milk | 20.6 |
| Salt | .4 |
| Neutral salt | .1 |

The granulated sugar or sucrose mentioned above can be replaced by other sugars, such as lactose, maltose, by a mixture of sucrose and dextrose, or by "invert syrup", a partially inverted syrup containing dextrose and levulose.

The gelatin cakes of the present invention can be flavored with "intensified fruits" prepared from fresh juices of the orange, cherry, raspberry, etc., and in some cases, as for example pineapple, fruit pulp can be retained in the "intensified fruit" to add further attractiveness to the dish prepared for the table.

We claim:

1. A method of preparing a gelatin product which comprises intimately mixing sugar, dry gelatin, fruit acid or salt, adding intensified fruit until a dough-like mixture is obtained, heating the dough-like mixture to a temperature of approximately 130° F. and aerating the mixture at that temperature.

2. A method of preparing a gelatin product according to claim 1 in which the mixture is aerated by adding 0.05% to .25% by weight of an effervescent salt mixture.

3. A method of preparing a gelatin product which comprises mixing 65 parts by weight of granulated sugar, 5 parts by weight of dry gelatin, 3 parts by weight of dry egg albumen, 0.5 part by weight of citric acid, 0.1 part by weight of salt, then adding 20 parts by weight of intensified fruit and 7 parts by weight of water, and mixing to form a dough-like mass, heating the dough to a temperature of 130° F., and then adding 0.1 part by weight of a neutral salt mixture and pouring the resulting aerated mass into a container.

4. A method of preparing a gelatin product which comprises mixing from 50 to 73 parts by weight of granulated sugar, from ¾ to 2 parts by weight of citric acid, less than one part by weight of salt, from 5 to 6.5 parts by weight of gelatin, from 17 to 35 parts by weight of intensified fruit, and from 0 to 4 parts of added water, to form a dough-like mass, heating the dough to a temperature of approximately 130° F. to soften it, aerating the softened dough and pouring it into containers.

LEONARD WICKENDEN.
WILLIAM BAPTISTE.